Aug. 18, 1931.   A. E. GREENE   1,819,238
ELECTRIC PROCESS OF REDUCING ORES
Filed July 17, 1924   2 Sheets-Sheet 1
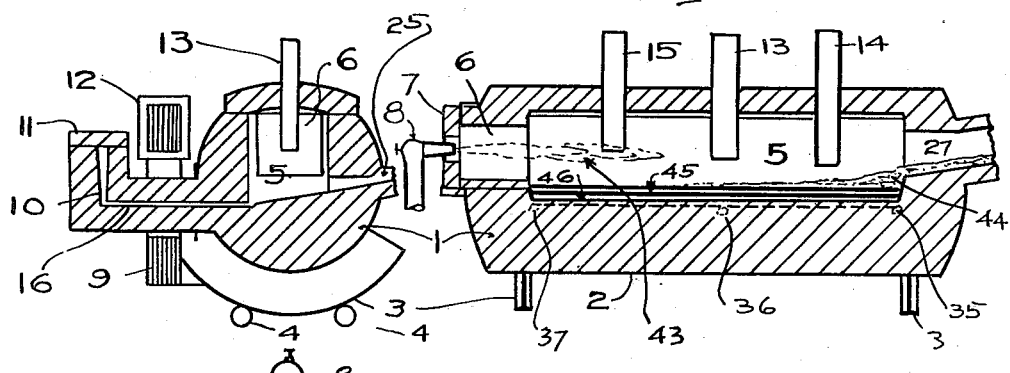
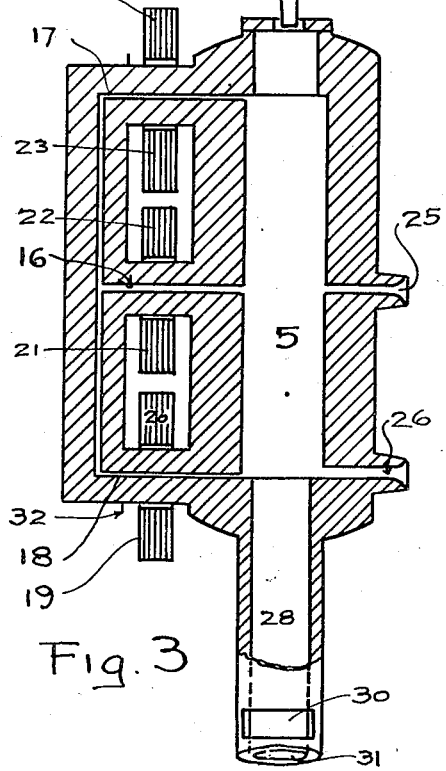
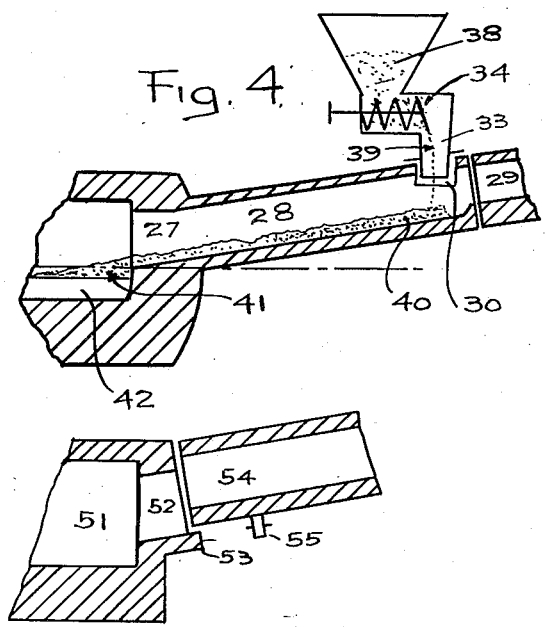

Aug. 18, 1931.  A. E. GREENE  1,819,238
ELECTRIC PROCESS OF REDUCING ORES
Filed July 17, 1924   2 Sheets-Sheet 2
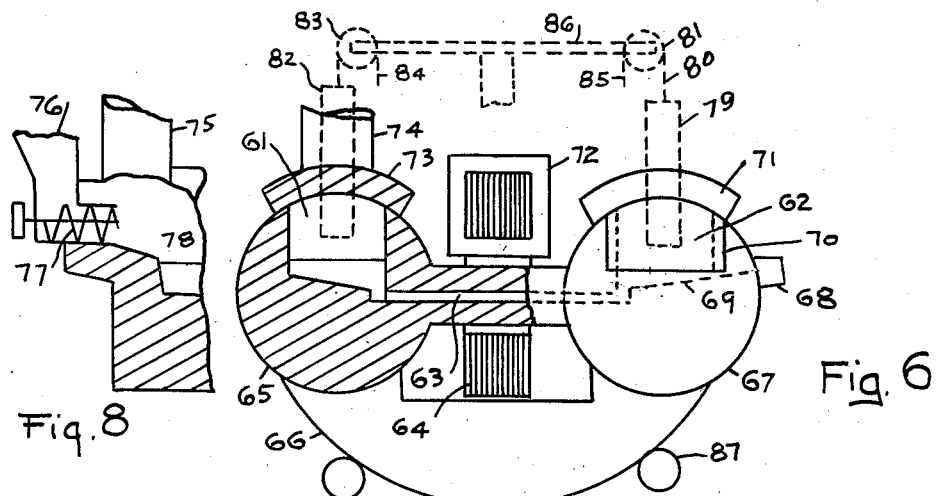
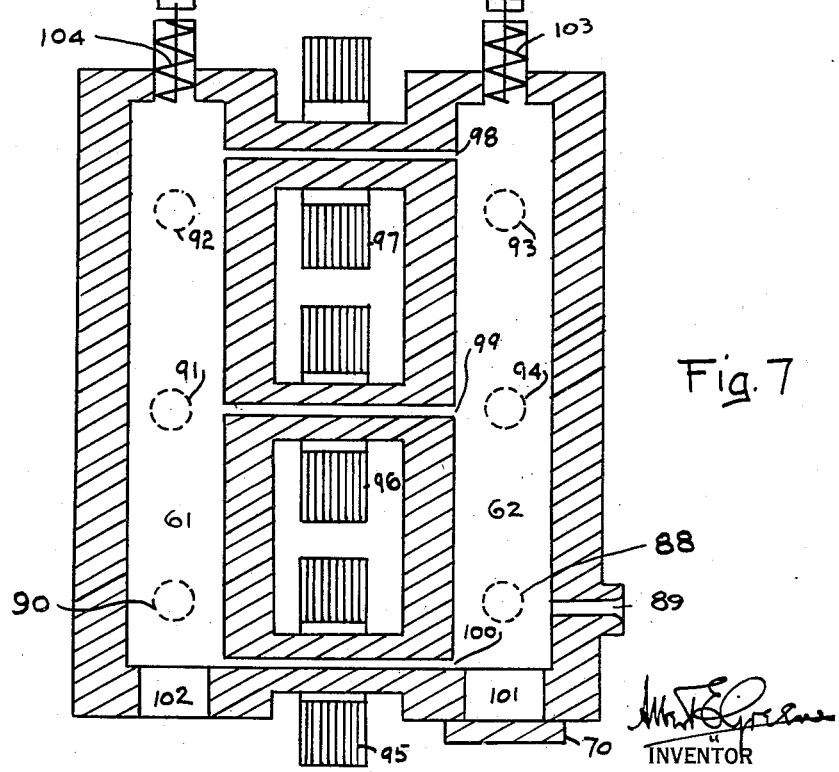

Patented Aug. 18, 1931

1,819,238

UNITED STATES PATENT OFFICE

ALBERT E. GREENE, OF MEDINA, WASHINGTON

ELECTRIC PROCESS OF REDUCING ORES

Application filed July 17, 1924. Serial No. 726,541.

This invention relates to improvements in metallurgical processes for the treatment of metal ores and has for its object an improved method of reducing oxide ores, such, for example, as iron and manganese oxide ores.

The process of this invention involves the treatment of the metal oxide mixed with carbonaceous material and suitable fluxing or slag forming materials in a reducing and melting chamber. The process has for its object in particular the reduction of a charge comprising metal oxide, carbonaceous reducing material and slag forming material under conditions which permit of substantial reduction of the metal oxide prior to substantial fusion of the remaining material and the final collection of the reduced metal and the slag materials in a molten bath in the smelting chamber.

I prefer to use a mixture of ore, carbonaceous material and fluxing material in which the components of the mixture are present in finely divided form to provide for intimate contact. In modifications of my invention I provide carbonaceous material in excess of the amount required for reducing the metal oxide so that carbonaceous material remains present through the stage of reduction prior to substantial fusion, and, in certain modifications, I provide a sufficient excess so that carbonaceous material remains and is present on the slag, not only through the preliminary reduction, but so that it remains on the slag after the remaining materials have been fused and collected in a molten bath of metal and slag.

Any suitable type of furnace may be employed, but I prefer to employ a furnace having an elongated chamber in which I may generate heat electrically in one part thereof.

In carrying out a process in accordance with this invention, I prefer to maintain a molten bath of metal and slag, such as the metal of the oxide ore to be reduced. The charge, comprising a mixture of metal oxide, carbonaceous material and slag forming material is passed into the smelting chamber onto a portion of the surface of the molten bath so as to form a pile or body over a portion of the bath.

The temperature within the chamber adjacent the charging end is preferably maintained high enough to cause reduction of the metal oxide to a substantial extent prior to or without substantial fusion of the charge proper. The opposite end portion of the smelting chamber is heated sufficiently to maintain the bath molten there and to effect or complete the fusion of the remaining components of the charge after reduction of the metal oxide has taken place to a substantial extent.

The mixed charge of ore, carbonaceous material and fluxing material when introduced into the smelting chamber forms a pile on top of the molten bath adjacent the charging end. As heating of the ore charge proceeds, reduction of the metal oxide gradually takes place, and then the materials in the charge gradually spread out over the surface of the molten bath and move toward the opposite end of the smelting chamber. As the reduction proceeds and the charge moves, small particles or globules of metal form and collect and pass downwardly toward the bath beneath and are finally collected in the molten metal bath beneath the slag as a result of the completion of the fusion of the remaining materials. As a result of this treatment, it is possible to reduce a substantial amount of the contained metal oxide at relatively low temperature. It is important that time be allowed for this gradual reduction to take place. The amount of carbonaceous material employed may vary, but is preferably in excess of the amount required for complete reduction of the metal oxide. Part of this excess may be burned in the chamber, and if sufficient carbon is originally present, the carbon will remain until after substantial reduction has taken place prior to fusion of the remaining materials, and, in certain modifications, enough carbonaceous material may be employed so that it remains throughout the treatment and appears on the molten slag at the end of the operation. The amount of carbonaceous material employed and the atmosphere within the chamber are regulated in accordance with the particular modification of my process which is carried out. The presence of solid carbonaceous material on the molten slag at the end of the chamber opposite the charge end, or at the end of the operation, makes it possible to further reduce the metal oxide remaining in the molten material after it reaches this stage of treatment. I do not wish to limit myself to so controlling the amount of carbonaceous material as to have it remain at the slag end of the operation, for the reason that my process may be carried out in different ways with more or less metal oxide remaining in the slag at the end of the treatment, and these modifications constitute the subject matter of other applications for patent on these different methods of treatment.

Continuous movement of the charge material from the charging end toward the opposite end may be maintained by continuously introducing charge materials. The molten slag and metal may be removed at intervals, or in large tonnage furnaces, the slag may even be tapped continuously. Movement of the charge through the smelting chamber may be assisted, especially in small chamber furnaces by employing a tilting or rocking furnace.

The components of the charge within the furnace are preferably chosen with a view to maintaining the components in such relation, acid and basic, as will result in a slag from which the metal oxides may be readily reduced. The slag is preferably withdrawn from the smelting chambers at the end opposite the charging end, and electric heating at this end is preferably used for the completion of the treatment.

The heating may be accomplished in any manner which will accomplish the objects of my invention. I prefer to heat the smelting chamber with electric heat at the finishing end, and to utilize combustion heat for heating the charge to reduce it prior to substantial fusion of the ore charge materials proper. But I do not limit myself to the means to be used for accomplishing the heating, so long as the objects of my invention are attained, and I may use a reverberatory heating chamber or any type of heating furnace to this end.

The invention will be better understood from a consideration of the following description in conjunction with the accompanying drawings.

In the drawings—

Fig. 1 is a sectional elevation of a furnace of my invention which may be employed for carrying out the process of the present invention.

Fig. 2 is a sectional elevation view of the furnace of Fig. 1 taken thru the electrodes.

Fig. 3 is a plan view in section of the furnace of Fig. 1, the section being taken thru the induction tubes.

Fig. 4 is a sectional elevation view of one modification of my invention showing a certain type of preheating chamber and arrangement for entrance of the ore.

Fig. 5 is still another modification showing a different means of charging the ore thru a separate rotating kiln.

Fig. 6 shows an elevation view partly in section of a two chamber type of furnace embodying and for practicing my invention.

Fig. 7 is a plan view in section of the furnace shown in Fig. 6.

Fig. 8 is another elevation view of one end of one of the chambers of the furnace of Fig. 6.

I will now describe these different modifications of the apparatus of my invention and later describe the complete process as it may be carried out in one or more modifications.

Referring to Figs. 1, 2 and 3, I have shown here a main chamber 5 elongated as shown in Fig. 2. The refractory lining is shown at 1 and the shell at 2. The shell is shown supported on rockers to roll or tilt on the rollers 4. The rockers are shown at 3.

A door way 6 is provided at one end of the chamber 5. This door way is closed by a door 7 and thru this door enters an oil burner or other kind of fuel burner at 8. The combustion gases can pass out the other end of the chamber 5 thru the opening 27.

The induction apparatus is located at one side of the main chamber 5. The magnetic core is seen at 9 in Fig. 1 and sections of the cores can be seen at 19, 20, 21, 22, 23 and 24 in Fig. 3. The primary winding may be seen at 12 in Fig. 1, and the tube for containing molten metal is at 16 connecting with the well or riser 10 which in turn is covered by a cover 11. In Fig. 3 the plan view of the several details may be seen. The tubes are shown at 16, 17 and 18. The shell containing the riser is connected to the main shell by a suitable insulated joint at 32.

Tapping spouts for metal and slag or either are shown at 25 and 26. In Fig. 3 is shown in section part of the entrance chamber for the charge at 28 and the hole thru which the charge enters this chamber may be seen in plan in Fig. 3 at 30 and in elevation also at 30 in Fig. 4. In Fig. 3 the gases may pass out the opening 31 into another chamber or stack or into the open.

Fig. 4 shows the apparatus for feeding the charge. A hopper 38 is provided and the charge may be fed by means of a screw 34 thru the part of the hopper box 33 into and thru the opening 30 and thence into the chamber 28 and thru the opening 27 into the chamber 5 of the furnace. The gases may pass out thru the chamber 29 which may be a kiln and rotatable or merely a flue. Part of the charge may enter thru the chamber 29 if desired.

In Fig. 5 is shown another modification of the charging end of the furnace of my invention. In this modification only a short entrance chamber 52 is provided as part of the main furnace opening into the main chamber 51 thereof. The entering charge comes in thru a chamber 54 which may be a rotary kiln and rotate on rollers as at 55. A projection 53 under the end of the kiln chamber 54 serves to catch the entering charge so that it will pass into the main chamber 51.

The processes which may be operated in these chambers and the modifications of these processes will be described later on in this specification.

I will now describe the modified form of furnace apparatus shown in Figs. 6 and 7, and Fig. 8. The type of furnace here shown has two main chambers connected with tubes for molten metal in which the metal may be heated by induction. Both the furnace shown in Figs. 1 to 5 and also in Figs. 6 to 8 inclusive may be rocked by suitable mechanism to make the metal flow thru the tubes from one chamber to another as described in my application for U. S. Patent Serial No. 455,601 filed March 25, 1921.

In the furnace shown in Figs. 6 to 8 inclusive, two shells are provided 65 and 67 mounted or supported on a suitable rocking frame 66 which may be rocked in any suitable way. This frame supports the magnetic core 64 in Fig. 6. The induction tube is shown in this figure at 63 and the openings of the three tubes may be seen in Fig. 7 at 98, 99 and 100. The main chambers are shown at 61 and 62 in both elevation and plan views. Suitable covers 71 and 73 are provided and are made removable so that material may be charged into the main chambers thru the top of the furnace chambers. The primary winding of one of the cores is shown at 72. The plan view in Fig. 7 shows three separate cores 95, 96 and 97. Each primary may be connected to a separate phase or to the same phase.

The main chambers differ in form from those used in my previous constructions of this type of furnace and are wider than heretofore so that the heated metal in the tubes may circulate out into a larger volume of metal where very high temperatures are not necessarily needed. In these chambers in Fig. 6 may be seen the small narrow section toward the core in each chamber. This permits the first charge of molten metal to fill the tubes and also fill the narrow portions of the main chamber without using the large amount of metal which the furnace will take as charge is melted into it. However the chambers may be filled to any desired level before starting.

Fig. 8 shows the construction which I may use in one modification of this invention for feeding charge into the chambers. A hopper 76 is provided with a feed screw 77 and this serves to pass the charge into the opening 78 of the main chamber. At 75 in Fig. 8 and at 74 in Fig. 6 is shown a flue for outlet of the gases.

In Figs. 6 and 7 I have also shown in dotted lines the electrode mechanism which may be used in these chambers if desired. In the plan view the location of the electrodes is indicated at 90, 91, 92, 93, 94 and 88. In the elevation view, Fig. 6, the electrodes are shown at 82 and 79. The electrodes are supported in any suitable way by means indicated at 80 as a cable extending over a sheave wheel 81 and the cable leading to a suitable hoisting mechanism not shown. Similar cable is indicated at 84 for the other electrode which may be operated independently of the right hand electrode. The sheave wheel is shown at 83 on the supporting member 86. This mechanism may be mounted so as to maintain the level of the ends of the electrodes at a suitable distance or in contact with the charge surface, while the charge surface moves by reason of the movement or rocking of the furnace. Or the rocking may be discontinued while the electrode heating is used.

The lower figure shows the openings for charge at 104 and 103 and also door openings 101 and 102 at the other ends of the chambers. These may be used for removal of charge or slag. One or more suitable spouts may be provided as indicated at 89 and the slag and metal may be taken out of these. Oil or other burners may be used in this modificaiton as indicated in the modification shown in Figs. 1 to 5 inclusive.

The electrical operation of this furnace may be controlled in accordance with the requirements of the material being heated. Thus more heat may be provided in the portion of the metal near the tap hole end of the furnace. This may be controlled by increase of heat development in the end tube 100 in Fig. 7 or by supplying current thru the two end electrodes 88 and 90 in the same figure. Thus if the charge entering at the opposite end of the furnace requires additional heat for fusion of viscous slag so that the latter can be poured out of the furnace, this heat can be provided thru the electrodes 88 and 90 which may operate in series with each other. Of course all the electrodes may be used and more heat developed in some than others.

Referring to the modifications shown in Figs. 1 to 5 the motion of the preheating chambers should be noted. A part of the preheating chamber shown at 28 and 27 is integral with the main chamber construction and moves with the main chamber as the latter rocks. This rocking on the rollers 4 serves to cause the incoming charge to move slightly from side to side of the chamber 28 and thru the opening 27 and the slant of the hearth in the chamber causes the charge to move forward as indicated at 40 in Fig. 4. After the charge passes into the opening 27 it then drops into the main chamber on top of the molten metal as indicated at 44. The rocking motion of the furnace continues to cause the charge to move along on top of the bath of molten metal and during its progress toward the end 6 of the furnace of Fig. 2 the heating and metallurgical reactions are carried on or completed.

The electrical parts of the furnace apparatus are so arranged that the control of the energy development is simple and in this way electrical energy may be saved by utilizing fuel combustion where it will aid the process. Thus for example in the reduction of iron ore, I may charge the iron ore in suitably fine form together with an excess of carbonaceous reducing agent like charcoal into the hopper 38 and have it feed into the chamber 28 of Fig. 4 and thence into the main chamber like that shown in Fig. 2. In Fig. 2 I have shown a fuel burner at 8. This may serve to produce a flame as indicated at 43 extending thru the chamber 5 of the furnace. The incoming charge in the chamber 28 is heated thereby and the flame may be controlled so as to burn the CO gas which comes off the incoming charge when it reaches the reacting temperatures. The presence of the air entering with the burner does not prevent the reduction because of the excess of reducing agent entering with the ore. Furthermore the excess of carbonaceous material so entering prevents the ore from undesirably fusing and stopping the reducing action. The incoming charge piles up at the incoming end of the electric furnace chamber and under the action of the heat from above and from the molten metal beneath this charge tends to reduce and to fuse and melt and flow along in the furnace chamber, spreading out towards the opposite end of the furnace and the rocking action of the furnace and consequent movement of the molten metal aids in stirring and moving the incoming charge. In this way the metal of the ore becomes reduced at relatively low temperatures and then collects in drops and melts into the bath beneath. The combined heating and rocking of the underneath metal is especially advantageous. Furthermore, the rate of movement of the charge can be easily controlled both in the entrance chamber and in the main chamber.

For the reduction of iron ore I may carry out the process as follows. Iron ore is crushed to fairly fine condition, preferably less than 1/4 inch mesh and is mixed with charcoal or other carbonaceous reducing agent. The amount of such reducing agent is in excess of the amount needed to combine with the oxygen of the iron oxide to be reduced. Preferably a considerable excess is provided so that as much as three quarters of the weight of iron ore is added or may be added as carbonaceous material or even more. If too much is added it can be taken out at the door 6 of the furnace when it gets there or increased air can be used and it may be burned out during progress thru the furnace chambers. This charge enters the upper end of the preheating chamber. The gases from the combustion in the main chamber enter and heat the incoming ore. Reduction takes place after the charge reaches temperatures over 500 deg. C. The charge gradually is raised to the temperatures approximating those of the molten iron at the incoming end of the kiln, end 27. The molten iron here need not be kept hot. In fact the iron can be kept at or even below the melting temperature in this end of the furnace and heated higher at the other end. This is not essential however to the reduction process.

Fluxes may be added with the ore charge. Lime may be provided to flux with silica or similar agents may be used. The lining of the furnace may be acid or basic and the process worked accordingly. As the incoming charge reaches the lower end of the main chamber the reduction of the iron oxide is largely completed. It is here that additional heat may be required at times to heat the slag so that it can be easily removed from the furnace and also to aid in completing the reduction of the iron oxide in the slag so as to make the process efficient. This can be done by using the electrodes as already mentioned. The presence of an excess of carbon makes the reduced iron take on carbon and cast iron or high carbon steel is thus produced. The reduced iron can be finished in any desired way, and the process may be made more or less continuous or a batch at a time.

It is to be noted that the electrodes entering the chamber 5 of the furnace shown in Figs. 1 and 2 are so arranged that they may be operated to maintain arcs while the rocking or oscillation of the furnace is continued. In this type of furnace the arcs may be formed at approximately the center of oscillation of the bath so that the movement of the bath surface is practically none or else a minimum and there is not required special raising or lowering of the electrodes to conform to the changes in metal level.

In the type of furnace shown in Figs. 6 and 7 an arrangement may be provided for adjusting the level of the electrodes as the metal level changes, or the supporting mechanism for the electrodes may be arranged so that it moves with the furnace and permits the electrodes to require only a minimum of adjustment as the furnace oscillates. It will be noted that the metal level in this type furnace may remain almost stationary while the furnace proper oscillates. In other words raising the chamber 62 causes the metal to seek the lower level but the level is almost the same when the chamber is raised because of the approximate equal size of the chambers.

It is understood that the feeding mechanism may be arranged to feed the charge continuously into the preheating chambers and that thence it can move, by reason of the motion of the furnace proper, into the melting chamber.

It is understood that the various details may be combined in different modifications without getting away from the novel and useful features of my invention.

What I claim is:

1. The metallurgical process which comprises passing a mixture of metal oxide, carbonaceous material and slag forming material into a smelting chamber, heating the charge within the chamber to reduce a substantial amount of the metal oxide without fusing the materials of the charge thereby to form particles or globules of reduced metal which pass downwardly through the charge, and subsequently fusing the remaining unreduced materials of the charge and producing a molten bath comprising molten metal covered by a layer of slag, the amount of carbonaceous material in the charge being in excess of that required to reduce the metal oxide and the operation being so controlled that a substantial amount of the excess carbonaceous material remains on the slag produced.

2. The metallurgical process which comprises placing a charge comprising a mixture of metal oxide, carbonaceous material and slag forming material on the surface of a molten bath in a smelting chamber, heating the charge within the chamber to cause gradual reduction of a substantial amount of the metal oxide and liquation of the resulting metal into the bath beneath without fusing the materials of the charge, and subsequently fusing the remaining unreduced materials of the charge and producing a molten bath comprising molten metal covered by a layer of slag.

3. The method of reducing oxide ores which comprises placing a charge comprising metal oxide, carbonaceous material and slag forming material on a molten bath in a smelting chamber, heating the charge within the chamber to a temperature sufficiently high to cause gradual reduction of the metal oxide before substantial fusion of the materials of the charge, whereby reduced metal particles or bodies form and pass downwardly through the charge, and finally fusing the remaining unreduced charge and collecting the reduced metal in the bath beneath.

4. The improvement in metallurgical operations which comprises placing a charge comprising a metal oxide, carbonaceous material and slag forming material on a portion of the surface of a molten bath in a smelting chamber, heating the charge to effect reduction of the metal oxide without fusing the original charge, and controlling the temperature to cause slag to form and spread over the surface of the bath as the reducing operation proceeds, the amount of carbonaceous material in the charge being in excess of that required to reduce the metal oxide and the operation being so controlled that a substantial amount of the excess carbonaceous material remains with the slag produced.

5. The improvement in metallurgical operations which comprises passing a charge comprising an intimate mixture of finely divided metal oxide ore, carbonaceous material and fluxing material through a smelting chamber on the surface of a molten bath, subjecting the charge to gradually increasing temperatures during the course of its passage through the smelting chamber to cause gradual reduction of the metal oxide and the formation of slag and metal particles which pass downwardly through the charge into the bath beneath the charge, the amount of carbonaceous material in the charge being in excess of that required to reduce the metal oxide and the operation being so controlled that a substantial amount of the excess carbonaceous material remains with the slag produced.

In witness whereof, I hereunto subscribe my name this 8th day of July, 1924.

ALBERT E. GREENE.